United States Patent [19]
Ellett

[11] 3,838,711
[45] Oct. 1, 1974

[54] THREE-WAY PILOT VALVE

[75] Inventor: James R. Ellett, Edmonton, Alberta, Canada

[73] Assignee: Bralorne Resources Limited, Calgary, Alberta, Canada

[22] Filed: Mar. 19, 1973

[21] Appl. No.: 342,342

[30] Foreign Application Priority Data
Apr. 4, 1972  Canada ............................ 138823

[52] U.S. Cl. ............................ 137/627.5, 251/233
[51] Int. Cl. .......................................... F16k 31/44
[58] Field of Search ................. 137/85, 627.5, 458; 251/233

[56] References Cited
UNITED STATES PATENTS

| 2,451,451 | 10/1948 | Tate | 137/85 |
| 2,656,014 | 10/1953 | Fites | 137/627.5 X |
| 2,812,218 | 11/1957 | Fitch et al. | 137/627.5 X |
| 3,340,898 | 9/1967 | Strauss et al. | 137/627.5 |

FOREIGN PATENTS OR APPLICATIONS

| 1,225,932 | 9/1966 | Germany | 137/627.5 |
| 651,963 | 4/1951 | Great Britain | 137/627.5 |

Primary Examiner—Robert G. Nilson

[57] ABSTRACT

In a three-way pilot valve, a valve actuating means having a bore therein, can seal a fluid conduit between signal and exhaust ports within the valve upon contact with a dual poppet. The dual poppet normally seals a fluid passageway between an inlet port and the signal port, but continued movement of the actuating means will open this passageway, the conduit still being sealed. Upon reverse movement of the actuating means, the fluid passageway will be sealed followed by opening of the fluid conduit to vent the signal port to the exhaust port.

8 Claims, 1 Drawing Figure

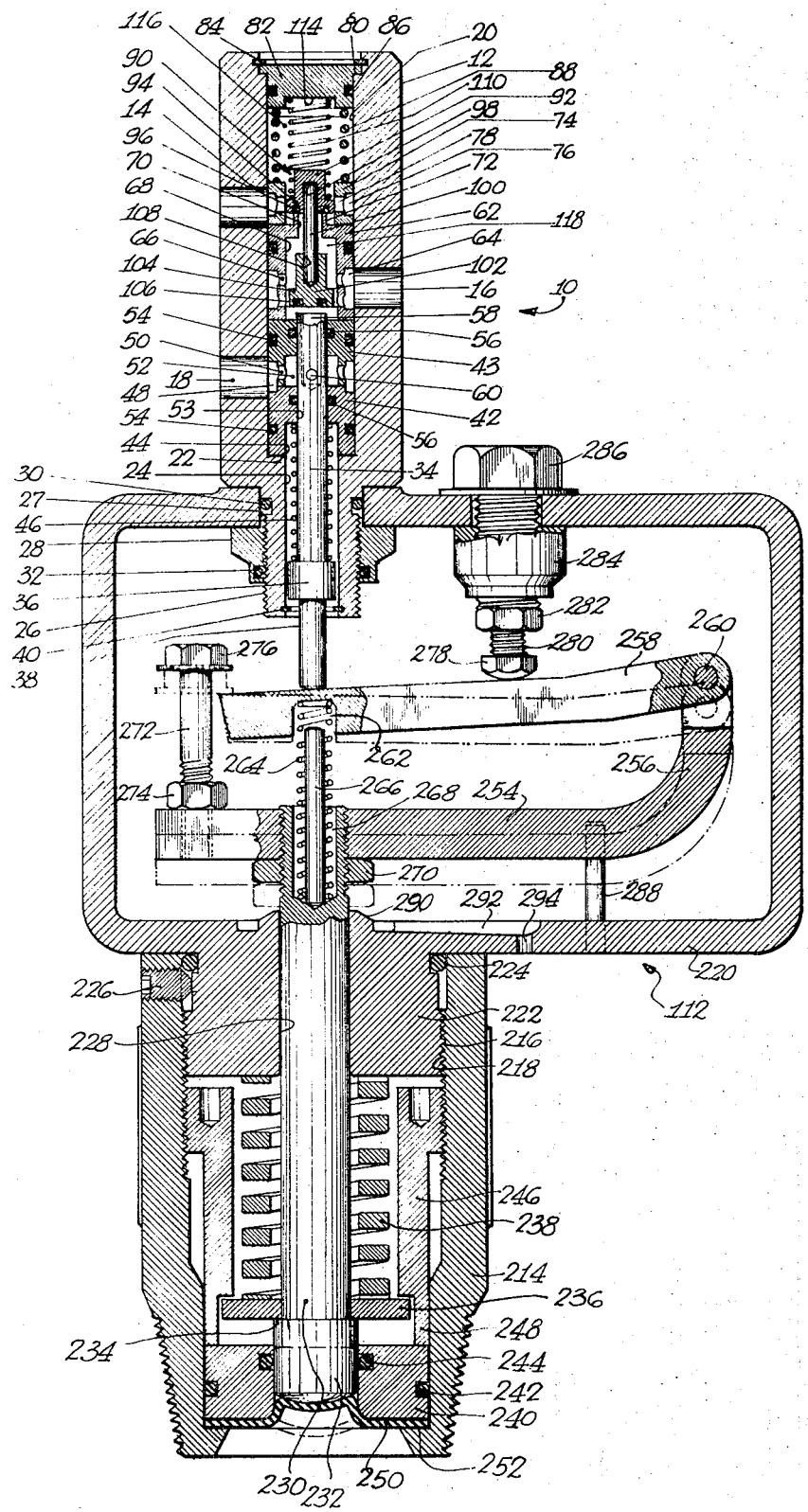

THREE-WAY PILOT VALVE

The present invention relates to valves in general, and to a three-way pilot valve in particular.

Many pilot or poppet valve designs have been presented to the market over the years, most of which are used in proportioning systems. In such valves actuation of the poppet or one or more of the seats is done through springs and balanced by air pressure. It then becomes very difficult to obtain accurate valve actuation, as the forces involved are not suitably related to each other.

The three-way pilot valve of the present invention overcomes these problems by providing a pressure control device which is highly accurate, preserves fluid and permits on-off action with minimum movement. In addition, air pressure does not constitute motive power for the poppets involved, thereby removing the interaction of pressure, spring action and deflections.

The three-way pilot valve of the present invention provides a housing having inlet, signal and exhaust ports and chambers, the inlet and signal chambers being interconnected by a fluid passageway. The inlet chamber is sealed by a first poppet portion therein of a dual poppet, the second poppet portion being contained in the signal chamber. A transfer pin rigidly connects the two portions. Valve actuating means is located within the housing and is sealingly slidable in a guide means separating the signal and exhaust chambers although a bore in the actuating means provides a fluid conduit between those two chambers. Under normal circumstances, the signal port is vented to the exhaust port by way of the signal chamber, the fluid conduit and the exhaust chamber. If the valve actuating means is moved a sufficient distance, it will contact the second poppet portion in the signal chamber thereby sealing the fluid conduit and hence sealing the signal port from the exhaust port. Continued movement of the actuating means will remove the first poppet portion from sealing engagement with the fluid passageway thereby placing the inlet port in fluid communication with the signal port via the inlet chamber, the fluid passageway and the signal chamber.

When the valve actuating means returns to its normal resting place, the first poppet portion seals the fluid passageway following which the seal between the second poppet portion and the fluid conduit is broken, allowing the signal port to vent to the exhaust port.

The invention will now be described in greater detail with reference to the attached drawing which shows the three-way pilot valve and a valve actuator in vertical cross-section.

The three-way valve of the present invention is generally designated by reference number 10 and may be used in conjunction with a valve actuator such as that shown as 112.

Three-way valve 10 includes a generally cylindrical housing 12 in which are located three radial ports 14, 16 and 18 axially spaced apart and communicating through the housing from the outer surface thereof to an inner cylindrical bore 20. At one end of bore 20 is an inwardly projecting flange providing an annular seat or shoulder 22 surrounding bore 24, coaxial with but of a smaller diameter than bore 20. The end of housing 12 in the vicinity of bore 24 is also of a smaller diameter and is externally threaded as at 26 so as to permit mounting of the three-way valve in a mounting hole such as 27 in, for example, valve actuator 112. The housing is firmly attached to the valve actuator by the action of threaded nut 28 tightened against the inside wall of the valve actuator. O-rings 30 and 32 seal the housing 12 in the mounting hole 27 and to the nut 28 respectively.

Within bore 24 and projecting both into main bore 20 and out of housing 12 is plunger 34. With the three-way valve oriented as depicted in the drawing, plunger 34 is provided with a radially outwardly projecting shoulder 36 near its lowermost end but still within bore 24. The portion 38 of plunger 34 below shoulder 36 projects out of housing 12 for interaction with a valve actuation element such as that designated 258 within valve actuator 112 to be later described. Retainer ring 40 is located in bore 24 adjacent its lowermost end and confines plunger 34 within the housing 12.

Spring-plunger guide 42 is located in bore 20 such that its lower surface abuts seat 22. Upper exhaust port element or guide means 43 also is located in bore 20 and abuts the upper surface of spring-plunger guide 42. Spring-plunger guide portion 42 is provided with an upwardly projecting bore 44 of the same diameter as bore 24. Between the shoulder 36 on plunger 34 and the end of bore 44 is plunger spring 46, coaxial with and surrounding the plunger and biasing the plunger towards retainer ring 40.

An annular groove 48 is provided in the adjacent outer walls of guide 42 and exhaust-port element 43 and is located adjacent to and in communication with exhaust port 18. In a plane substantially concurrent with the axis of exhaust port 18 are a plurality of circumferentially spaced holes 50 communicating between annular groove 48 and central exhaust chamber 52 formed within the body of the exhaust port element. It will be noted that bore 53 is provided to receive plunger 34 and that the bore appears in both portions 42 and 43 thereby providing a continuous path for plunger 34 through these portions. O-rings 54 and 56 provide sealing action as between bore 20 and the two portions and as between plunger 34 and bore 53 respectively.

When plunger 34 is in its lowermost position its upper end is substantially flush with the upper surface of exhaust port element 43. A bore 58 is provided coaxially in the upper end of plunger 34 and descends sufficiently so that a radially directed hole 60 communicates with chamber 52.

Within bore 20 and abutting the upper surface of exhaust-port element 43 is signal-port element 62. This element is also provided with an annular groove 64 and a plurality of circumferentially spaced radially directed holes 66 communicating as between groove 64 and a central bore 68. At the upper end of this element is another bore 70 of a diameter less than bore 68, said bore 70 being surrounded outside the main body of element 62 by an annular upstanding projection 72.

Annular inlet-port element 74 is provided within bore 20 and abutting the upper surface of signal-port element 62, the inner diameter of element 74 being greater than the outer diameter of projection 72. Element 74 is provided with the usual annular groove 76 and circumferentially spaced holes 78, substantially coplanar with the axis of inlet port 14.

The upper end of housing 12 is provided with an annular shoulder 80 adjacent bore 20 for reception of body cover 82. Body cover 82 is held in place by retainer ring 84 and sealed to bore 20 by o-ring 86. Cover 82 also retains body spring 88 in place as it applies a downwards force to port elements 74, 62, 43 and spring-plunger guide 42 thereby holding each of these items in place.

Another feature of the three-way valve of the present invention is dual poppet 90. It basically comprises an inlet poppet 92, a signal poppet 102 and a transfer pin 100. Each poppet is of an essentially inverted "T" shape in cross-section, each having an outwardly projecting shoulder 94, 104 respectively and an annular seal 96, 106 respectively in its lower surface. Poppet spring 110 is confined between a recess 114 in the lower surface of body cover 82 and shoulder 94 of inlet poppet 92, thereby biassing the dual poppet 90 away from cover 82. In such a biassed state seal 96 seats against projection 72 thereby preventing any fluid flow from inlet chamber 116 to signal chamber 118. It should be noted that seal 106 is designed to fit in sealing contact with the annular end of plunger 34. Transfer pin 100 is held rigidly in bores 98, 108 in inlet poppet 92 and signal poppet 102 respectively.

The operation of the three-way valve of the present invention will now be described. With the components in the position illustrated, signal-port 18 is vented to exhaust port by way of annular groove 64, holes 66, signal chamber 118, bore 58, hole 60, chamber 52, holes 50 and annular groove 48. At the same time inlet port 14 introduces air, gas or any other control fluid into inlet chamber 116 where it is confined.

When the valve is actuated, as by element 258 within valve actuator 112, plunger 34 is forced upwards against spring 46 until it contacts seal 106 is signal poppet 102. At this point signal port 16 is no longer vented to exhaust port 18. Continued upward movement of plunger 34 will force dual poppet 90 upwards breaking the seal between seal 96 and projection 72. The fluid in inlet chamber 116 then is free to progress through to signal port 16 and do useful work therein.

As plunger 34 descends, poppet spring 110 applies sufficient pressure on dual poppet 90 to maintain the seal between seal 106 and the annular end of plunger 34. Thus the inlet chamber 116 is sealed off from the exhaust port 18 long before the signal port 16 is again vented to exhaust port 18 as it will be when dual poppet 90 has ceased its descent but plunger 34 has continued its descent.

It is evident from the above description that no cross flow will occur during the shift from open to closed position and vice versa. It should also be noted that very small plunger movement is required to shift the valve from the closed to the open position. This is made possible by the interdependence of the inlet and signal poppets on each other when performing their opening and closing functions. The actual differential movement from closed to open is the sum total of the resiliency of both poppet seat inserts plus flow clearance for both the inlet and exhaust functions, this being in practice as low as 0.006 inches. The small axial displacement requirement makes the three-way valve of the present invention very suitable as a precision control element.

As mentioned previously there is no cross-flow from inlet to exhaust as the valve shifts from open to closed. This is advatntageous as the inlet fluid is thus conserved, as only the amount of fluid required to perform the signal function is consumed and vented. No "bleeding" of fluid takes place during the valve shift.

It is also important to realize that the flow pattern is such that flow is always downward, from inlet to signal and from signal to exhaust. If control gasses which are not dry are used when operating outside, say in winter, the flow arrangement prevents accumulation of moisture and thereby avoids freezing when the temperature drops.

While the three-way pilot valve of the present invention may be utilized with any appropriate actuator, a preferred actuator is that disclosed in my copending Canadian application, Ser. No. 132,764, filed Jan. 19, 1972. That particular valve actuator is designated by reference number 112 and is especially adapted to provide the same response to both an above-maximum and a below-minimum sensed condition. Valve actuator 112 will now be described in greater detail.

Structurally, valve actuator 112 includes a base housing 214 which may be externally threaded for reception in a pressure conduit or in any housing containing an appropriate measurable quantity. While not essential to the invention, housing 214 may be generally cylindrical in shape. Internal threads 216 coact with external threads 218 on projection 222 to connect the linkage housing 220 to base housing 214. The connection therebetween is sealed by O-rings 224 and locked by set screw 226. Projection 222 is provided with a central longitudinal bore 228 in which piston 230 is slidably received.

At the lower end of piston 230 is an extension 232 of a diameter slightly greater than that of the piston itself, so as to form a shoulder or step 234. An annular spring base plate 236 has its inner diameter such that it will sit on step 234 and thus retain spring 238 between itself and the underside of projection 222. In this manner the piston 230 is biased away from housing 220. Extension 232 is slidable within piston guide 240 which is held within base housing 214. O-rings 244 and 242 seal extension 232 to guide 240 and guide 240 to housing 214 respectively. Piston guide sleeve 246 is threaded into housing 214 so that its lower portion 248 locks guide 240 between itself and internal flange 252 of housing 214. Diaphragm 250 is also locked between guide 240 and flange 252, the diaphragm being operable under a suitable pressure influence to apply an axial force to piston 230.

Piston 230 is threaded externally at its other end and bored internally as at 268. Threaded to piston 230 is transfer yoke 254, the yoke being of a general "L"-shape, the leg thereof being essentially horizontal and the foot 256 thereof being essentially vertical. At the uppermost end of yoke 254 toggle bar 258 is pivotably attached as by pivot pin 260. Toggle bar 258 reverses the direction of yoke 254 and is provided with a recess 262 in its lower surface substantially above bore 268 in piston 230. Extending between the bottom end of bore 268 and the top end of recess 262 is transfer compression spring 264 guided by transfer spring guide 266. Spring 264 tends to bias movable toggle bar 258 away from yoke 254.

The amount that toggle bar 258 may be biased from yoke 254 is determined and set by low pressure adjusting screw 272. Screw 272 is so positioned that the free end of toggle bar 258 abuts against the underside of screw head 276. The height of screw head 276 above yoke 254 and hence the displacemnt of bar 258 away from yoke 254 is adjustable merely by turning screw 272 in or out with respect to yoke 254. Screw 272 may be locked in position with lock nut 274.

High pressure adjusting screw 280 is assembled into the top surface of housing 220 in a manner to be now described. Retainer 286 is received in a hole in housing 220 and affixed thereto by means of retainer lock nut 284. Retainer 286 has an axial threaded bore therein (not shown) into which adjusting screw 280 is threaded. Screw 280 may be locked in position with lock nut 282.

The valve actuator will now be described with reference to valve assembly 10 and its own actuator, plunger 34. It must be remembered that the valve assembly 10 gives two responses and it is desired that one of those responses is to be utilized for two separate positions of actuator 112.

Considering first actuation in response to a below minimum condition, assume housing 214 is connected to a pressure system whereby the system pressure can act on diaphragm 250. Thus, in a low pressure situation, spring 238 will force piston 230 downwards against diaphragm 250 thereby also lowering transfer yoke 254, along with low pressure adjusting screw 272. The free end of toggle bar 258 is biased against the underside of screw head 276 and thus it is also lowered with piston 230. Valve actuating stem or plunger 34 is biased towards toggle bar 58 and it too will be lowered thereby providing one response in valve 10, namely the venting of signal port 16 to exhaust port 18. As mentioned previously, the height of screw head 276 relative to toggle bar 258 determines the pressure at which valve 10 response as desired.

Consider now actuation in response to an over-maximum condition. Diaphragm 250 will be forced upwardly against extension 232 of piston 230, overcoming the compression forces in spring 238 and raising piston 230 along with transfer yoke 254. Continued upward movement will bring the upper surface of toggle bar 258 into contact with the rounded head 278 of high pressure adjusting screw 280, at which point upward movement of toggle bar 258 ceases. Further upward movement of transfer yoke 254 and the consequent upward movement of pivot pin 260 causes the toggle bar 258 to rock on rounded head 278, thereby lowering the free end of toggle bar 258 whereby valve actuating stem 34 is lowered providing a response in valve assembly 10 identical to that provided in the below-minimum condition.

There is a dimensional consideration related to the length of toggle bar 258 and the position of the point of contact of adjusting screw 280 with respect to pivot pin 260 and valve actuating stem 34. Screw head 278 is desirably half way between pivot pin 260 and stem 34 so that motion upwards of pin 260 relative to screw head 278 results in an equal downward motion of stem 34. Thus the adjustment of the screw 280 can be readily determined and applied thereto to set the maximum pressure point.

In addition to the main features of the valve actuator herein described, ancillary features now described aid in providing smooth operation of the actuator. Roll pins 288 are mounted in housing 220 to prevent rotation of transfer yoke 254 around the axis of piston 230. They permit transfer yoke 254 to move easily up or down due to clearance provided therein for the pins. Within housing 220 is bevelled boss 290 surrounding piston 230 which connects to a surrounding and ever-deepening groove or ditch 292. Ditch 292 connects to drain hole 294 located at the lowest point thereof. Thus condensation which could seize the piston to the housing is prevented from entering the clearance fit around the piston.

Housing 220 is also provided with a removable cover, not shown, which permits access thereto so that adjustments may be made to the high and low pressure adjusting screws.

Operation of the valve actuator has been described particularly with reference to above-maximum and below-minimum conditions. Between the two extremes, valve actuating stem 34 is raised sufficiently to give a response in valve assembly 10 different to the response already described, namely the venting of inlet port 14 to signal port 16.

The valve actuator has been described primarily in association with a pressure system which provides the appropriate forces against diaphragm 250. It is contemplated that the valve actuator could be used in any system where a mechanical movement proportional to a measurable quantity can be effectively transmitted to piston 230.

I claim:

1. Valve assembly comprising a pilot valve and a valve actuator, said pilot valve having an annular body member including an inlet port, a signal port and an exhaust port, said ports communicating through said body member with an inlet chamber, a signal chamber and an exhaust chamber respectively, a dual poppet comprising an inlet poppet portion in said inlet chamber, a signal poppet portion in said signal chamber and pin means ridgily joining said portions, a fluid passageway communicating between said inlet and signal chambers, annular guide means positioned between said signal and exhaust chambers and valve actuating means slidably sealed within said guide means, said valve actuator including sensing means for sensing a condition, transfer means operatively connected to said sensing means, actuator means operatively connected to said transfer means and to said actuating means and a plurality of adjusting means for setting a maximum allowable and a minimum allowable condition for response of said valve, the response of said valve at said maximum condition being identical to the response of said valve at said minimum condition.

2. Valve assembly according to claim 1 wherein said valve actuating means includes fluid conduit means therein, said fluid conduit means comprising an axially directed bore in said actuating means and a radially directed bore communicating between said axially directed bore and said exhaust chamber.

3. Valve assembly according to claim 2 and including resilient spring means in said body member coacting with said inlet poppet portion to bias said inlet poppet portion into sealing engagement with said fluid passageway.

4. Valve assembly comprising a pilot valve and a valve actuator, said pilot valve having an annular body member including an inlet port, a signal port and an exhaust port, said ports communicating through said body member with an inlet chamber, a signal chamber and an exhaust chamber respectively, a dual poppet comprising an inlet poppet portion in said inlet chamber, a signal poppet portion in said signal chamber and pin means rigidly joining said portions, a fluid passageway communicating between said inlet and signal chambers, annular guide means positioned between said signal and exhaust chambers and valve actuating means slidably sealed within said guide means, said valve actuator including sensing means for sensing a condition, transfer means operatively connected to said sensing means, actuator means operatively connected to said transfer means and to said actuating means and a plurality of adjusting means for setting a maximum allowable and a minimum allowable condition for response of said valve, the response of said valve at said maximum condition being identical to the response of said valve at said minimum condition, said adjusting means including a first adjusting screw attached to said actuator means to effect operation of said valve at said minimum condition and a second adjusting screw attached to a housing enclosing said actuator means and engageable with said actuator means to effect operation of said valve at said maximum condition.

5. Valve assembly according to claim 4 wherein said transfer means includes a transfer piston longitudinally supported in said housing and biased towards said sensing means and transfer yoke means attached to said piston at an end remote from said sensing means and said actuator means includes toggle bar means pivotally connected to said yoke means and resiliently biased away therefrom.

6. Valve assembly according to claim 5 wherein said transfer yoke means includes a first portion extending generally perpendicular from said piston and a second portion generally parallel thereto and located laterally therefrom at a free end of said first portion, said bar means being pivotally attached to a free end of said second portion and extending therefrom towards said piston, said first adjusting screw being attached to a third portion of said transfer yoke means diametrically opposed to said first portion.

7. A valve assembly according to claim 6 wherein said second adjusting screw is located between said second portion of said yoke means and a recess in said bar and acts as a fulcrum to reverse the direction of travel of the free end of said bar means as said piston and yoke means travel away from said one end of said housing.

8. A valve assembly according to claim 4 wherein said inlet, signal and exhaust chambers are arranged generally vertically so that flow between said inlet and signal chambers and between said signal and exhaust chambers is always downwards.

* * * * *